United States Patent
D'Angelo et al.

(10) Patent No.: US 9,396,628 B1
(45) Date of Patent: Jul. 19, 2016

(54) ELECTRONIC WHISTLE SENSOR

(71) Applicants: Kevin D'Angelo, Carmel, CA (US);
James Fannin, Pebble Beach, CA (US);
Matthew Arruda, Pebble Beach, CA (US)

(72) Inventors: Kevin D'Angelo, Carmel, CA (US);
James Fannin, Pebble Beach, CA (US);
Matthew Arruda, Pebble Beach, CA (US)

(73) Assignee: TLWAM LLC, Carmel, CA (US)

( * ) Notice: Subject to any disclaimer, the term of this patent is extended or adjusted under 35 U.S.C. 154(b) by 0 days.

(21) Appl. No.: 14/583,680

(22) Filed: Dec. 27, 2014

(51) Int. Cl.
*G08B 5/36* (2006.01)
*G10K 5/00* (2006.01)

(52) U.S. Cl.
CPC ... *G08B 5/36* (2013.01); *G10K 5/00* (2013.01)

(58) Field of Classification Search
CPC .................................. G08B 5/36; G10K 5/00
USPC .............................. 340/322, 323 R
See application file for complete search history.

(56) References Cited

U.S. PATENT DOCUMENTS

| | | | |
|---|---|---|---|
| 6,844,816 B1* | 1/2005 | Melton | G07C 9/00111 340/5.27 |
| 9,210,963 B1* | 12/2015 | Ellis | A42B 3/30 |
| 2004/0207524 A1* | 10/2004 | Slomowitz | A47D 7/02 340/545.1 |
| 2013/0235702 A1* | 9/2013 | Saguin | A63B 71/616 367/198 |

* cited by examiner

*Primary Examiner* — Qutbuddin Ghulamali

(57) ABSTRACT

An improved all electronic sensor to detect when a whistle emits an audio signal. The electronic sensor activates an additional function such as a light, or signaling device to activate remote functions, such as submerged speakers, or time keeping apparatus.

18 Claims, 5 Drawing Sheets

ELECTRONIC WHISTLE SENSOR

CROSS REFERENCE TO RELATED APPLICATIONS

This application claims the benefit of PPA Ser. No. 62/017,103, filed Jun. 25, 2014 by the present inventors, which is incorporated by reference.

BACKGROUND OF THE INVENTION

This relates to whistles, specifically to whistles with more functionality than audio generation.

In sporting events such as basketball, the referee blows a whistle to signal various occurrences such as rule violations in real time. Video recordings of games are often consulted, for example, as in the event of a dispute in an instant replay, or at a later time as a study of a previously played game. Often, it is difficult to determine when the whistle was blown because at slow video playback speeds, the whistle recording becomes inaudible. Alternately, crowd noise may interfere with the recording or immediate perception of the whistle sound. A whistle that is illuminated when blown provides an additional perception mechanism well suited to sporting events and video.

In water polo, often, players cannot hear the whistle because they are underwater and thrashing about. Missing a whistle sound affects the real time playing decision making. A whistle that transmits a wireless signal to activate an underwater speaker when blown provides a direct path to the underwater players and can alleviate the missed call problem.

In emergency, wilderness, hunting or maritime situations, it is sometimes difficult to determine the source and direction of a whistle sound. A whistle that lights up when blown provides increased sensory input for these situations.

Hotel personnel utilize a whistle to signal a request for a taxi. An illuminated taxi whistle would allow the taxi driver to pinpoint the location of the request amid the hubbub of people coming and going.

Similar situations where enhanced whistle function is beneficial are, but not limited to, sporting events involving hearing impaired athletes and traffic policing activities. In general, an illuminated whistle would benefit the deaf population as a whole.

The industry standard whistle has no moving parts because moving parts are prone to jamming due in part to excess moisture and thus malfunction during operation. Prior art shows whistle detection schemes that sense air pressure by employing moving diaphragms, mechanical switches and such embedded in the whistle in U.S. Pat. No. 4,314,316 and U.S. Pat. No. 6,181,236. Moving parts and electrical elements combined with moisture are inherently unreliable. Another scheme, in U.S. Pat. No. 5,293,254 utilizes a microphone and a sophisticated electronic receiver to detect sound with a given whistle characteristic. This scheme requires a cumbersome wire leading from the microphone to the receiver unit attached to the user. To avoid false detection, care must be taken to filter interference noise picked up by the microphone from the crowd or an errant non-official whistle. This results in a complicated and bulky receiver attached to the user's belt. These characteristics are all undesirable in a portable system.

None of the above provides a non-mechanical, wireless, secure, lightweight integrated detection solution.

SUMMARY

This invention utilizes an all-electronic scheme for whistle audio detection that relies on the natural resonance found in the body of a sounding whistle. When the whistle emits an audio signal, the body of the whistle vibrates at its resonant frequency. The vibration is then detected via a MEMS (microelectromechanical system) based accelerometer integrated circuit attached to the whistle.

The accelerometer is part of a larger sensor circuit that might also comprise a filter circuit, a rectifier circuit, and a battery. The sensor circuit can be made small enough to be attached to the exterior of a given whistle as an add-on. Or, the electronic nature of the sensor circuit would allow it to be integrated into a whistle body that could be a slightly altered modification of a non-sensing whistle. Or the sensor could be wholly integrated into the whistle.

In any case, since the sensor is attached to the whistle, there is no chance of interference from another whistle or from outside environmental factors.

The output of the sensor circuit would typically serve as an ON/OFF signal for another device (for example an LED driver, or a transmitter). In order to achieve a clear signal, further conditioning to the signal produced by the accelerometer is required. Often, the signal taken directly from the accelerometer will be small in amplitude, and will possess an undesired DC offset. An active high pass filter will remove the DC offset and amplify the signal. A second order Sallen-Key high pass filter with a 3 dB frequency of 500 Hz to 1000 Hz will suffice. A band pass filter may be used for finer frequency selection.

The amplified and filtered signal is then rectified by a diode, capacitor, and resistor circuit to generate the sensor circuit's output.

Alternatively, a sensor with a digital interface (e.g. the LIS2DH from ST microelectronics) may be used in conjunction with a microprocessor with filtering and rectification implemented in software. The microprocessor executes software that continuously polls the data registers that contain the accelerometer movement and keeps track of how often a vibration impulse occurs. When the impulses occur regularly, they are interpreted as a vibration. When the vibration is interpreted, an output port on the microprocessor is used as an ON/OFF signal for the desired device such as an LED driver.

Some accelerometer devices (again, the LIS2DH) possess an interrupt output that signals the detection of an impulse. The microprocessor can utilize this interrupt so that it does not need to spend all of its processing time polling for the impulse. Instead, it can idle or perform other functions while it waits for the interrupt signal to change state to signify it is time to read and interpret the data registers.

The resonant frequency of a typical whistle is in the range of 3.5 kHz, which lies in the higher spectrum of use for a typical MEMS accelerometer, but still produces an adequate signal in some devices (e.g. the LIS332AX, LIS2DH and associated product family members from ST Microelectronics). An accelerometer detects movement along a plane which can be resolved into movement along axes. In a typical integrated circuit, to achieve three dimensional resolution, three MEMS accelerometers are included along the three orthogonal axes, X, Y and Z. The whistle detection will typically only require a single axis accelerometer. For the industry standard FOX 40 Classic whistle, the most effective axis is an axis lying parallel to a surface on the whistle to which the accelerometer is attached (X or Y when the IC is flat against the whistle). This axis tends to yield the largest signal from the accelerometer when the whistle resonates. Other whistles may have different characteristics resulting in the Z-axis (perpendicular to the whistle) yielding the best signal.

The output signal of the sensor circuit can then serve as the ON/OFF signal for another function, such as an LED system that could be directly attached to the whistle and which produces light while the whistle is producing sound. Another example might be a transmitter that sends the whistle's status ("Yes I am producing a sound") to another electronic device, such as a base station.

In the case of the LED system (comprising an LED driver and one or more LED's) any LED driver may be employed, such as a DC/DC converter that generates a higher or lower voltage suitable for driving one or more LEDs. If the battery voltage is adequate, a simple electronic switch may serve as an LED driver. If the battery capacity is adequate for the specific application, the battery and the LED system could both be mounted on, or built into the whistle itself.

The same enable signal can be used to activate a wireless radio frequency transmitter for remote sensing; one example being an underwater speaker application. A simple and secure ON (i.e. "Yes I am producing a sound") signal can be transmitted by a remote keyless entry type system which can be made small enough to integrate onto the whistle. A base station receiving unit decodes the keys transmitted by all of the whistles made part of the system via a pairing procedure. With a successfully decoded key received from one of the paired whistles, the receiver unit generates an audio signal for the speaker. This type of system is secure because the remote keyless entry transmitter operates with a secure coding system, e.g. a rolling code type of encoding.

In a similar application with a base station, the base station might stop the clock. In a more sophisticated system, the base station might record when a whistle was blown in order to facilitate clock management in situations where clock starting and stopping is a function of the time at which the whistle is blown. Basketball is a good example of a sport having a complex set of rules governing clock stopping and starting where this function could be utilized.

Other more sophisticated and powerful wireless protocols may alternatively be employed. ZigBee, Wi-Fi, and Bluetooth all operate at higher power levels for greater distance, but require more complex circuitry. These protocols have the ability to transfer more than simply ON/OFF information. A more sophisticated system could, for instance, transmit the geographical position of the whistle.

Battery power for the whistle detector system can be provided by a small battery mounted on the whistle itself. A Li Ion battery can be small enough and have high enough power density to suffice for many applications. Other types of batteries, such as a coin cell, may be employed; however they generally possess higher output impedance and lower capacity that would yield inferior performance with functions such as LED drivers and RF transmitters that require short bursts of higher power.

A typical sensor circuit may have quiescent current consumption of on the order of 0.5 mA steady state. An LED board consumes nearly zero quiescent current, but can draw up to 120 mA for the time the whistle sounds and the LEDs produce light. A wireless transmitter may consume about 50 mA while transmitting as the whistle sounds.

A readily available, compact, whistle mounted 40 milli-amp-hour Li Ion battery can power these applications and provide 80 hours of standby quiescent current.

The battery, detector and feature may be permanently mounted to a whistle, or may be separately integrated into a unit that mounts and unmounts onto a whistle.

DETAILED DESCRIPTION

Here we describe the whistle with integrated battery and LEDs.

Figure 1:
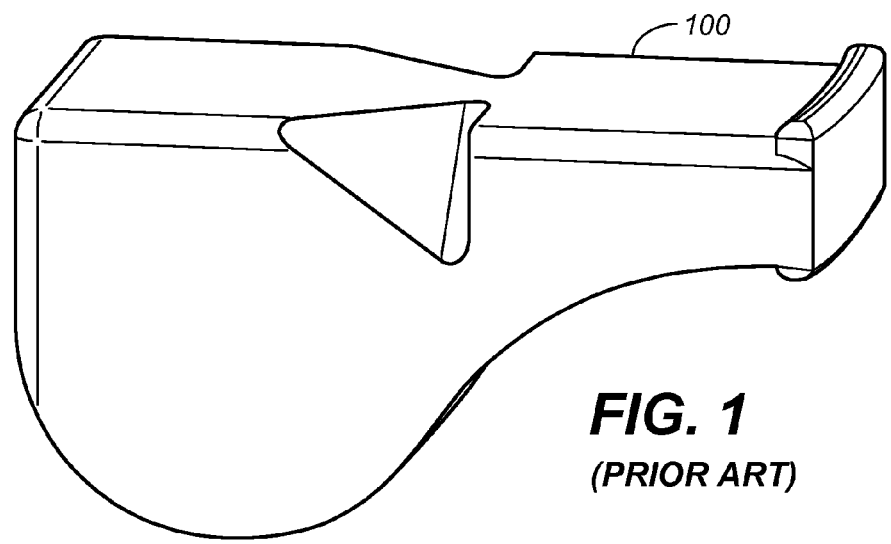
FIG. 1 is a drawing of an unadulterated industry standard whistle.

In one embodiment of the invention, multiple circuit boards plus a battery are adhered to whistle 100 of FIG. 1.

In another embodiment of the invention, a single circuit board, which contains all of the necessary detection and illumination circuitry, is adhered to whistle 100 of FIG. 1. A battery connected to the circuit board may rest atop or alongside the circuit board.

Figure 4:
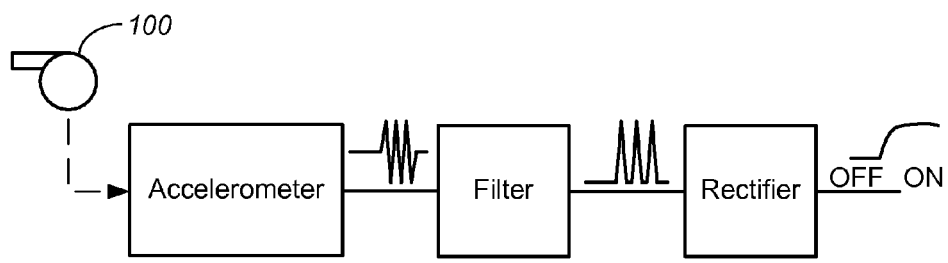
FIG. 4 shows a block diagram of the sensor.
Figure 5:
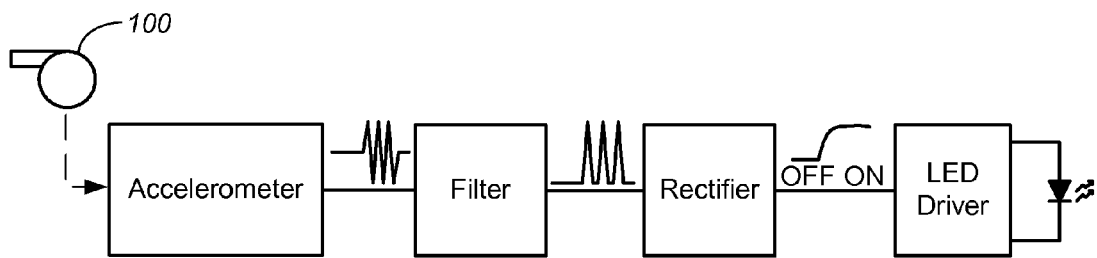
FIG. 5 shows a block diagram of the sensor providing control to an LED.
Figure 6:
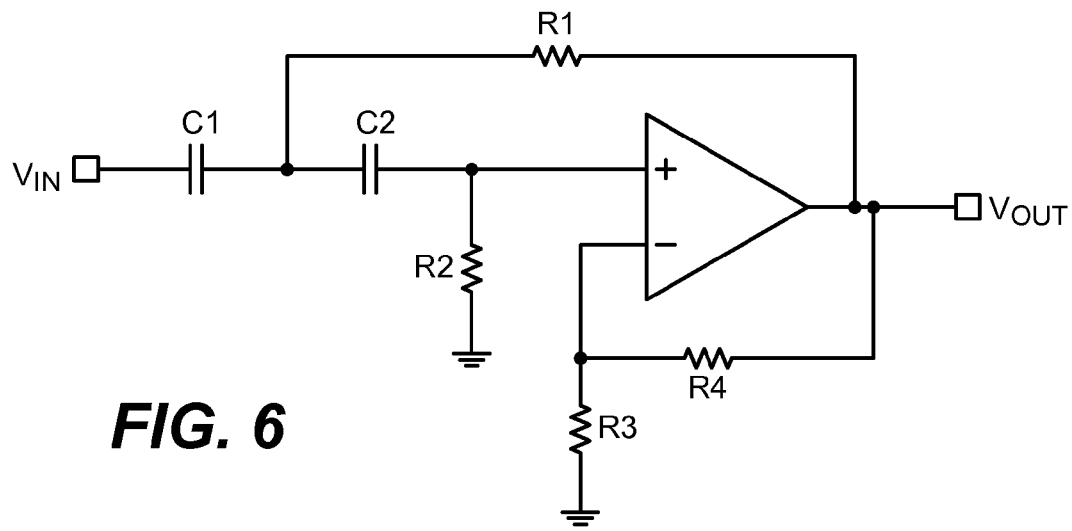
FIG. 6 shows a high pass filter.
Figure 7:
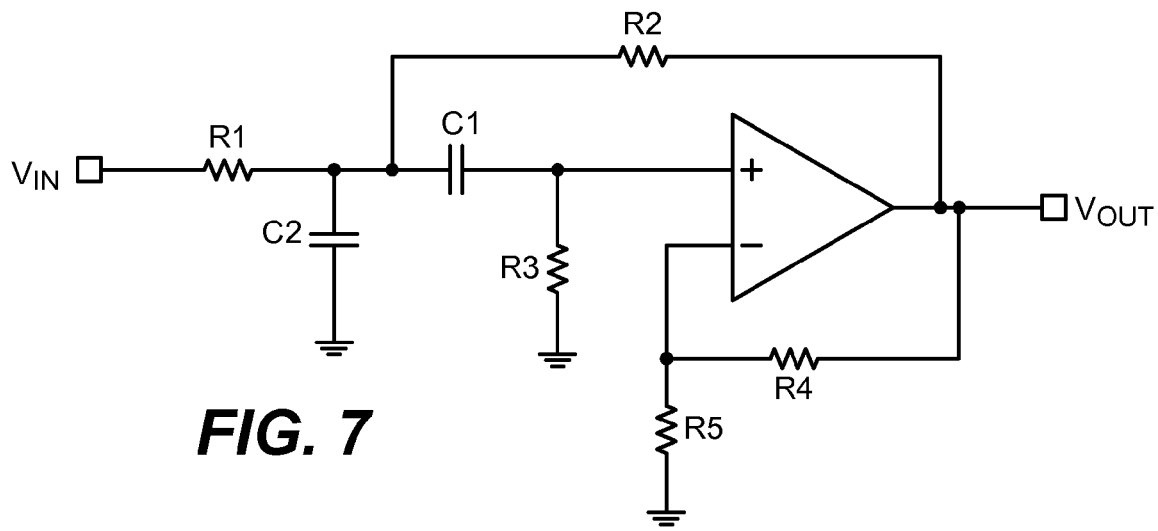
FIG. 7 shows a band pass filter.
Figure 8:
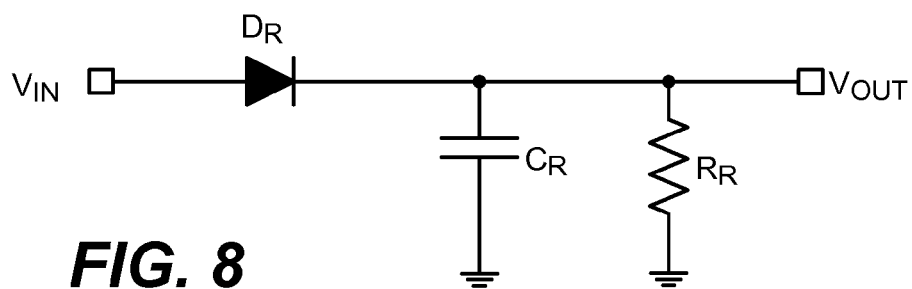
FIG. 8 shows a rectifier circuit.
Figure 9:
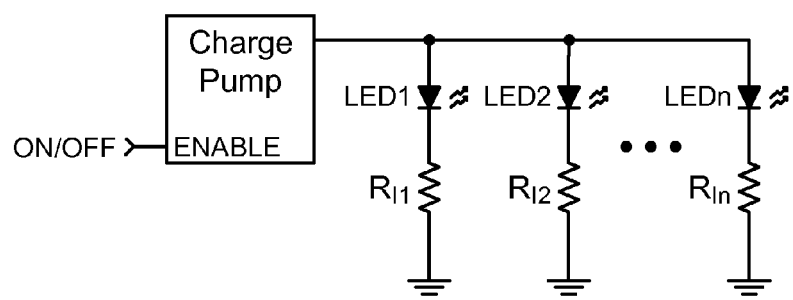
FIG. 9 shows an LED driver circuit.

Here we describe the sensor. Referring to FIG. 4, the accelerometer on the sensor circuit board produces an oscillating output signal when whistle 100 emits sound and resonates. The accelerometer output signal is small in amplitude and possesses a DC offset, so a filter is required to remove the DC offset and to amplify the signal. A Sallen-Key high pass filter, as shown in FIG. 6, with a 3 dB frequency between 500 Hz and 1000 Hz, and a gain of 3 is employed. The filtered signal is then rectified by diode $D_R$ and capacitor $C_R$ as shown in the rectifier circuit schematic of FIG. 8. Resistor $R_R$ in parallel with $C_R$ is required to pull the voltage across $C_R$ to zero in the absence of a signal. The time constant of the rectifier $R_R$ and $C_R$ is chosen to be a few milliseconds to ensure it is longer than the period of the detected signal. Referring to FIG. 5, the rectified signal is used as an ON/OFF signal for an LED driver. In one embodiment of an LED driver, shown in FIG. 9, a charge pump is used to increase the battery voltage to achieve the maximum current for the brightest LED operation. The ON/OFF input to the LED driver activates the charge pump via an ENABLE input on the charge pump. A multitude of parallel LEDs (LED1, LED2, to LEDn) are powered from the charge pump output. Each LED lies in series with a corresponding current setting resistor $R_{I1}$, $R_{I2}$ to $R_{In}$, between the LED and ground. The $R_{In}$ resistors ensure current is shared more or less equally among the parallel LEDs.

In a variation of this embodiment, all components are integral to the whistle itself and cannot be removed.

Figure 2:
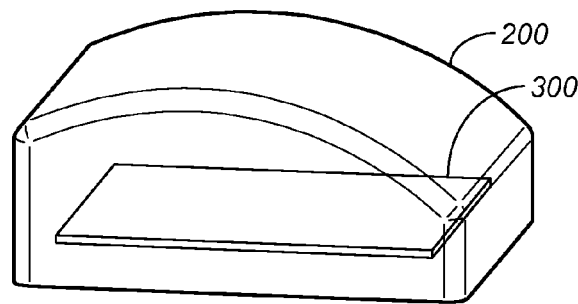
FIG. 2 shows a housing containing a circuit board.

The same components minus the whistle constitute another embodiment as shown in FIG. 2. Housing 200 contains the electronic sensor circuit, LED driver circuit, LEDs, battery charger and associated circuitry on circuit board 300. Housing 200 is constructed in part or wholly from clear material, such as plastic, to allow the contained LEDs to emit light to the outside of the housing.

Figure 3:
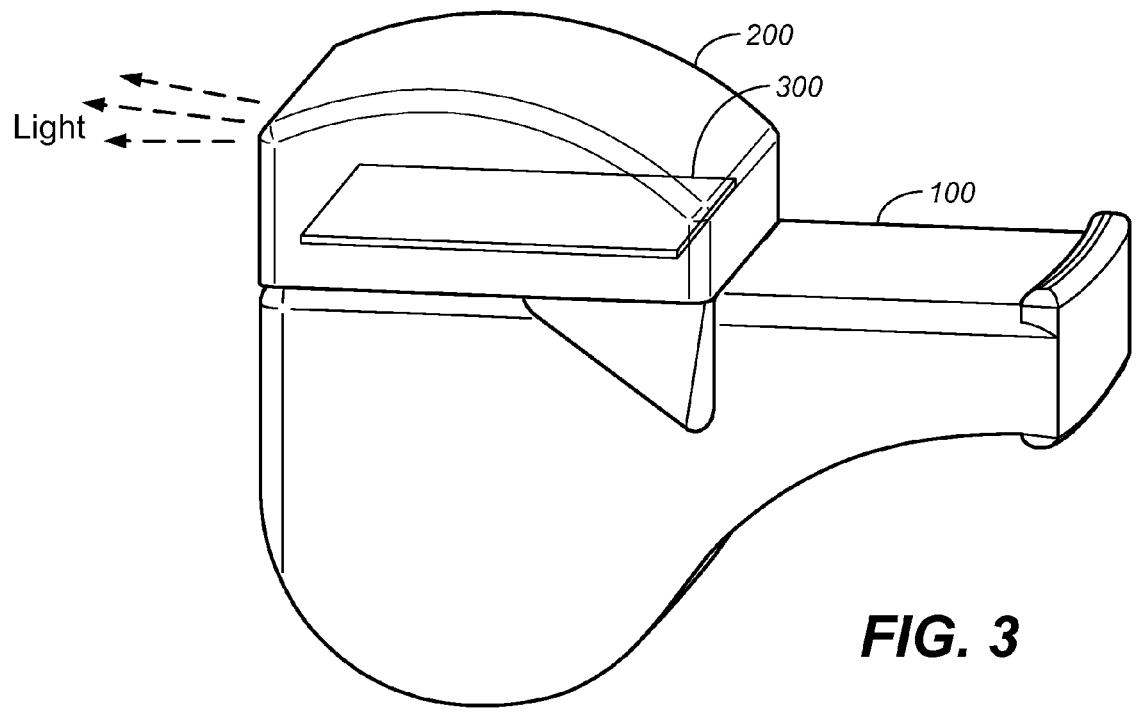
FIG. 3 shows a housing combined with a whistle.

In FIG. 3 an embodiment with housing 200 containing electronics circuit board 300 mounted to whistle 100 is shown.

Here we describe the whistle with an integrated battery, sensor and wireless transmitter communicating with a base station.

Figure 10:
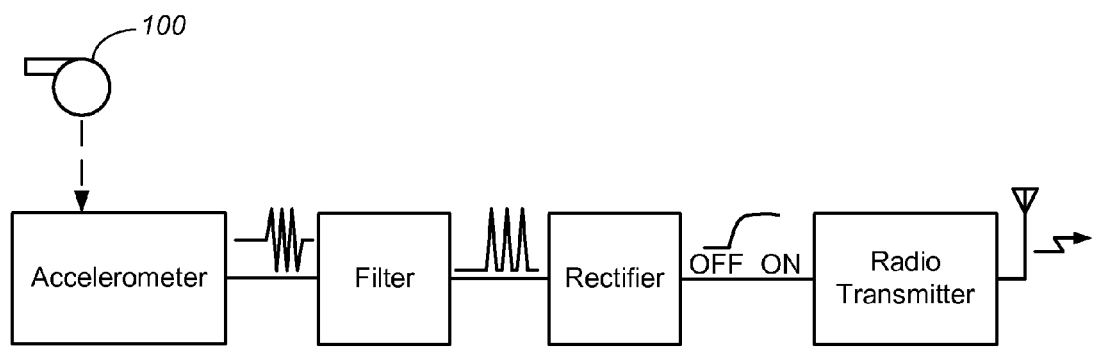
FIG. 10 shows a block diagram of the sensor providing wireless transmission.
Figure 11:
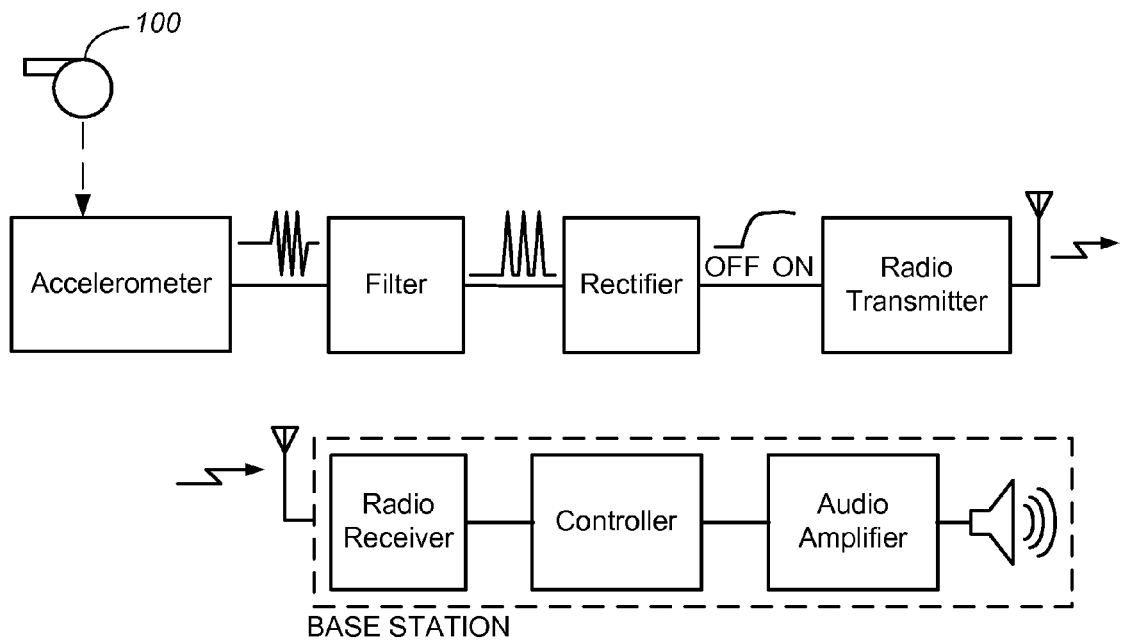
FIG. 11 shows a block diagram of the sensor providing wireless transmission and reception to activate a speaker.

As shown in FIG. 10, a transmitter, receiving a direct ON/OFF signal from the sensor, wirelessly transmits the RF (Radio Frequency) ON/OFF information. For simplicity, the wireless transmission is by means of an RKE (Remote Keyless Entry) system. A base station shown in FIG. 11 further comprises a controller for decoding the incoming wireless signal. The same controller can be used to generate an audio tone which in turn would be amplified by an audio amplifier and connected to the audio input of a speaker system. The controller is a micro controller with software to perform the decoding operation and function generation.

Figure 12:
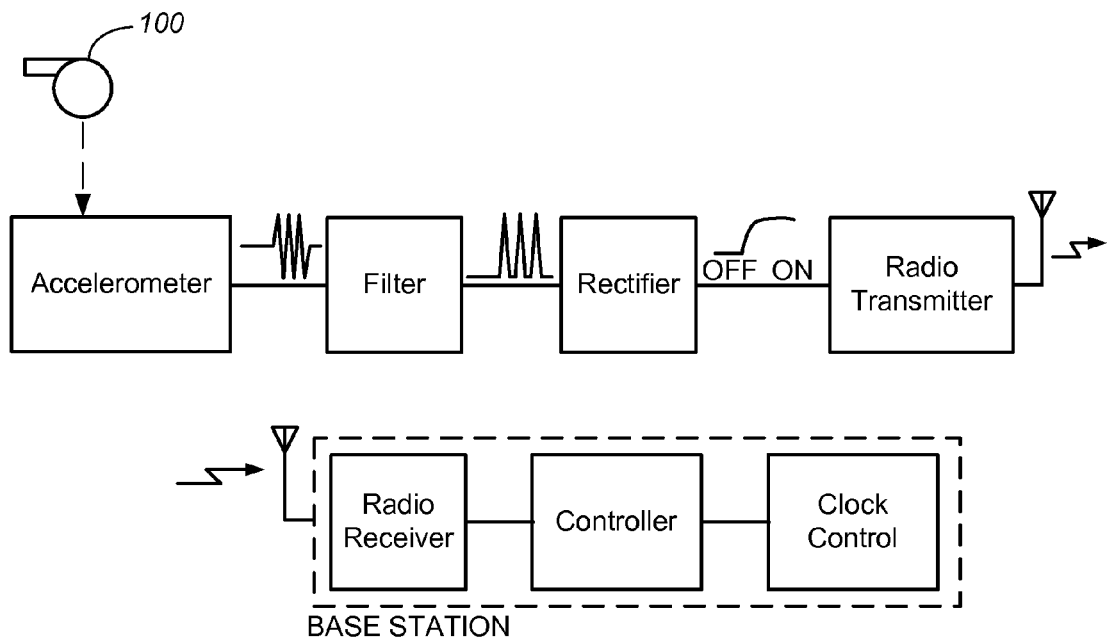
FIG. 12 shows a block diagram of the sensor providing wireless transmission and reception to control a clock.

Another base station, shown in FIG. 12, uses a controller to decode the incoming RF signal, and to generate signals that can be used to control a clock control system.

As with the LED board, the wireless transmitter is either mounted on the whistle, integrated into a separately attached unit, or is integral to the whistle.

What is claimed is:

1. A system that comprises:
    a whistle that produces a sound;
    a power source;
    a detection circuit connected to the power source and physically attached to said whistle, said circuit comprising a MEMS (microelectromechanical system) based accelerometer;
    wherein said system is configured such that the accelerometer detects the resonant vibration of the whistle and then causes the detection circuit to produce an electronic signal when the whistle produces a sound.

2. The system as in claim 1 wherein said detection circuit further comprises a filter sub-circuit that normalizes and filters the output of the MEMS based accelerometer.

3. The system as in claim 2 wherein said filter sub-circuit is a band-pass filter.

4. The system as in claim 2 wherein said filter sub-circuit is a high-pass filter.

5. The system as in claim 2 that further comprises one or more LEDs connected to the detection circuit,
    wherein said system is configured such that the LEDs emit light when the detection circuit indicates that the whistle is emitting a sound.

6. The system as in claim 5 wherein the detection circuit and the LEDs are mounted on the whistle.

7. The system as in claim 2 that further comprises an RF transmission subsystem connected to the detection circuit,
    wherein said system is configured such that the RF transmission subsystem transmits an indicative radio signal when the detection circuit indicates that the whistle is emitting a sound.

8. The system as in claim 7 wherein the detection circuit, the RF transmission system, and the power source are mounted on the whistle.

9. The system as in claim 7 or claim 8 wherein the RF transmission subsystem is of a Remote Keyless Entry type.

10. The system as in claim 7 or claim 8 wherein the RF transmission subsystem is of a Bluetooth type.

11. A device that comprises:
    a battery;
    a detection circuit connected to the battery, said detection circuit comprising a MEMS based accelerometer;
    wherein said device is configured such that when the device is physically attached to a whistle, the accelerometer detects the resonant vibration of the whistle and then causes the detection circuit to produce an electronic signal when the whistle produces a sound.

12. The device as in claim 11 wherein said detection circuit further comprises a filter sub-circuit that that normalizes and filters the output of the MEMS based accelerometer.

13. The device as in claim 12 wherein said filter sub-circuit is a band-pass filter.

14. The device as in claim 12 wherein said filter sub-circuit is a high-pass filter.

15. The device as in claim 12 that further comprises one or more LEDs,
    wherein said device is configured such that the LEDs emit light when the detection circuit indicates that the whistle is emitting a sound.

16. The device as in claim 12 that further comprises an RF transmission subsystem,
    wherein said device is configured such that the RF transmission subsystem transmits an indicative radio signal when the detection circuit indicates that the whistle is emitting a sound.

17. The device as in claim 16 wherein the RF transmission circuit is of a Remote Keyless Entry type.

18. The device as in claim 16 wherein the RF transmission circuit is of a Bluetooth type.

* * * * *